United States Patent [19]

Gitlitz et al.

[11] Patent Number: 5,000,790

[45] Date of Patent: Mar. 19, 1991

[54] LIQUID COATING COMPOSITION COMPRISING AN ORGANOTIN DI- OR TRICARBOXYLATE AND AN ORGANIC FLUOROACID, AND METHOD OF COATING A TRANSPARENT SUBSTRATE THEREWITH

[75] Inventors: Melvin H. Gitlitz; David A. Russo, both of Edison, N.J.

[73] Assignee: Atochem North America, Inc., Philadelphia, Pa.

[21] Appl. No.: 513,728

[22] Filed: Apr. 24, 1990

Related U.S. Application Data

[63] Continuation-in-part of Ser. No. 232,962, Aug. 16, 1988, abandoned.

[51] Int. Cl.$^5$ ................................................ C09D 7/14
[52] U.S. Cl. .......................... 106/287.19; 106/287.18; 427/160; 427/163; 427/164; 427/165
[58] Field of Search ...................... 106/287.19, 287.18; 427/160, 108, 126.3, 163, 164, 165

[56] References Cited

U.S. PATENT DOCUMENTS

| | | | |
|---|---|---|---|
| 4,144,362 | 3/1979 | Larkin | 427/226 |
| 4,419,386 | 12/1983 | Gordon | 427/109 |
| 4,547,400 | 10/1985 | Middleton et al. | 427/160 |
| 4,548,836 | 10/1985 | Middleton et al. | 427/160 |
| 4,743,506 | 5/1988 | Russo et al. | 428/389 |

Primary Examiner—William R. Dixon, Jr.
Assistant Examiner—Alan Wright
Attorney, Agent, or Firm—Stanley A. Marcus; Robert B. Henn

[57] ABSTRACT

A liquid coating composition comprises an organotin di- or tricarboxylate and an organic fluoroacid for forming a fluorine-doped tin-oxide coating on glass having good bulk resistivity and haze values. The method of coating a transparent substrate with the composition is also described. The preferred liquid coating composition comprises about 50 to 80 wt. % of dibutyltin diacetate, and about 20 to 50 wt. % of trifluoroacetic acid.

12 Claims, No Drawings

LIQUID COATING COMPOSITION COMPRISING AN ORGANOTIN DI- OR TRICARBOXYLATE AND AN ORGANIC FLUOROACID, AND METHOD OF COATING A TRANSPARENT SUBSTRATE THEREWITH

CROSS-REFERENCE TO RELATED APPLICATION

This application is a continuation-in-part of our copending application Ser. No. 232,962, filed Aug. 16, 1988, and now abandoned.

BACKGROUND OF THE INVENTION

1. Field of the Invention

This invention relates to doped tin oxide coatings on glass, and more particularly, to a composition of fluorine-doped tin oxide coatings on glass for the improvement of haze and electrical properties.

2. Description of the Prior Art

Belanger, et al., in J. Can. Cer. Soc. 52, 28–32 (1983), and J. Electrochem. Soc. 32, 1398–1405 (1985), describe a method of forming doped tin-oxide films on glass substrates by chemical-vapor deposition (CVD) of dibutyltin diacetate with antimony (V) chloride or trichlorotrifluoroethane as dopants in an oxidizing atmosphere, using nitrogen as a carrier gas at substrate temperatures of from 420 to 450 degrees Centigrade (°C.). These doped films, however, have relatively high bulk resistivities of greater than $10^{-3}$ ohm-centimeter (ohm-cm).

Abe, et al., in Japanese Patent No. 61,188,821, issued Aug. 22, 1986, describe a method of preparing fluorine-doped tin-oxide coatings, using trifluoroacetic acid as the dopant in from 25 to 65 percent by weight (wt. %) of trichloroethane as a solvent. Abe et al. also obtain relatively poor bulk resistivities.

SUMMARY OF THE INVENTION

The liquid coating composition of this invention comprises from about 50 to about 80 wt. % of an organotin di- or tricarboxylate and from about 20 to about 50 wt. % of an organic fluoroacid. In a preferred embodiment of the invention, the liquid coating composition includes from about 50 to about 60 wt. % of dibutyltin diacetate, and from about 40 to about 50 wt. % of trifluoroacetic acid.

DESCRIPTION OF THE PREFERRED EMBODIMENTS

This invention provides a composition and method for making fluorine-doped tin oxide coatings on glass, wherein the treated articles have reduced haze, and bulk resistivities of about $10^{-4}$ ohm-cm.

The present invention further provides a liquid coating composition including an organotin di- or tricarboxylate and an organic fluoroacid, from which a fluorine-doped tin oxide coating of predetermined thickness having excellent bulk resistivities and haze values may be made by CVD onto glass substrates. As used herein, the term "organotin" is defined as a compound of tin having at least one organic group covalently bonded to the tin atom; "organic fluoroacid" is chosen to mean a carbon compound with at least one carboxyl or substituted carboxyl group, and having at least one fluorine atom covalently bonded in the molecule.

A most-preferred embodiment of this invention is a liquid coating composition comprising dibutyltin diacetate and trifluoroacetic acid, from which a fluorine-doped tin oxide coating of about 2000 Ångstroms (Å) thickness can be made by CVD onto a glass substrate having a bulk resistivity of about $10^{-4}$ ohm-cm., a Gardner haze value of less than 1%, a visible transmittance of more than 80%, and an infrared reflectivity of greater than 65%.

The organotin compounds of the liquid coating composition are represented by the general formula $R'_x Sn(O_2CR'')_{4-x}$, where R' is a $C_1$ to $C_4$ straight- or branched-chain alkyl, or $R'''CH_2CH_2$, where R''' is $R^{IV}O_2C$ or $CH_3CO$, and where $R^{IV}$ is $C_1$ to $C_4$ alkyl, R'' is $C_1$ to $C_4$ straight- or branched-chain alkyl, and x is 1 or 2.

Illustrative but non-limiting examples of organotin compounds suitable for use herein comprise the group consisting of dibutyltin diacetate, butyltin triacetate, methyltin triacetate, dimethyltin diacetate, dibutyltin dipropionate, dimethyltin dipropionate, methyltin tripropionate, diisobutyltin diacetate, bis(carbomethoxyethyl)tin diacetate, and bis(3-oxobutyl)tin diacetate.

The organic fluoroacid dopants suitable for use in this invention are reactive fluorine compounds which are strong acids, or fluorine-containing acid compounds with boiling points below about 250° C.

Examples of dopants suitable for use in the present invention include, but are not limited to, the group consisting of trifluoroacetic acid, difluoroacetic acid, perfluoropropionic acid, chlorodifluoroacetic acid, trifluoroacetic anhydride and perfluoropropionic anhydride. A preferred dopant is trifluoroacetic acid.

The liquid coating compositions of the invention contain from about 50 to about 80 wt. % of a liquid or low-melting organotin carboxylate, and from about 20 to about 50 wt. % of the fluorine dopant, which is either soluble in the organotin, capable of being solubilized by a third agent, or capable of being vaporized separately from the organotin compound. The preferred liquid coating compositions comprise from about 50 to about 60 wt. % of the organotin compound, and from about 40 to about 50 wt. % of the fluorine dopant.

In the method of this invention, the fluorine-doped tin-oxide coatings are deposited by CVD, preferably from a vaporized liquid coating composition; the compounds also can be vaporized separately in a heated chamber maintained at from about 100° to about 300° C., and preferably from about 130° to about 200° C. A preheated carrier gas transport the vapor to a nozzle which disperses the vapors uniformly over a substrate, usually glass, heated to a temperature of from about 450° to about 750° C., and preferably from about 600° to about 700° C. The carrier gas can be air, oxygen, or nitrogen, and its temperature can range from about 100° to about 300° C., and preferably from about 130° to about 200° C. The flow rate of the carrier gas can range from about one to about 100 liters per minute (l/min.), preferably from about 25 to about 75 l/min., and its velocity can range from about 0.25 to about 5 meters per second (m/sec), and preferably from about 0.5 to about 3 m/sec. The concentration of the precursor in the carrier gas can range from about 0.1 to about 10 mol %, and preferably from about 0.1 to about 2 mol %.

Fluorine-doped tin oxide coatings prepared according to the invention have bulk resistivities of less than $9 \times 10^{-4}$ ohm-cm., haze values of under 1% as measured on the Gardner Haze-meter, a visible transmittance of 80% or more, and an infrared reflectivity of more than 65%, for a coating thickness of 2000 Å.

The advantages of this invention are illustrated by, but are not limited to, the following example.

EXAMPLE (a) A liquid coating composition of 60 wt. % dibutyltin diacetate (DBTA) and 40 wt. % trifluoroacetic acid (TFA) was injected via a syringe pump into a 170° C. air stream flowing at 70 l/min. The concentration of the vaporized solution in air was 0.25 mol %. The vapor was transported to a soda-lime silica-glass substrate maintained at a temperature of 600° C. A transparent, conductive fluorine-doped tin oxide coating with a thickness of about 1920 Å was deposited. The bulk resistivity was measured as $6.3 \times 10^{-4}$ ohm-cm., and the Gardner haze value was less than 1%. The sheet resistance of the film was 33 ohms/square, as measured by a four-point probe.

(b) The effect on bulk resistivity of varying the concentration of TFA in the liquid coating composition is shown in the following table.

| Effect of Concentration of Trifluoroacetic Acid on Bulk Resistivity of Films | |
|---|---|
| Liquid Coating Composition DBTA/TFA Ratio, wt. % | Fluorine-Doped Tin-Oxide Film Bulk Resistivity $\times 10^{-4}$ ohm-cm |
| 50/50 | 6.3 |
| 60/40 | 6.1 |
| 70/30 | 7.1 |
| 80/20 | 8.1 |
| 90/10 | 12.4 |
| 95/5 | 19.2 |

The results shown in the table illustrate that the desired low bulk resistivities of $10^{-4}$ ohm-cm are achieved with a DBTA/TFA ratio of about 50:50 wt. %. On the other hand, compositions with relatively lower amounts of TFA produce fluorine-doped tin oxide coatings having much poorer bulk-resistivity values.

The preferred compositions of this invention provide coatings which have low bulk resistivities and low haze values, at a relatively high tin content. These parameters are achieved herein preferably by using from about 50 to about 60 wt. % of DBTA and from about 40 to about 50 wt. % of TFA in the coating process.

Those skilled in the art will realize that the improved coatings obtained in this invention can be made by CVD where the components of the composition are substantially devoid of any solvent, e.g. where there is less than about 10% solvent by weight of the composition. However, where advantageous for, e.g., process mechanics or economics, a solvent or carrier gas such as, e.g., air, oxygen, or nitrogen can be employed in the operation.

Modifications and improvements to the preferred forms of the invention herein disclosed and illustrated may occur to those skilled in the art who come to understand the principles and precepts thereof. Accordingly, the scope of any patent to be issued hereon should not be limited to the particular embodiments of the invention set forth herein, but rather should be limited only by the advance by which the invention has promoted the art.

What is claimed is:

1. A liquid coating composition comprising from about 50 to about 80 wt. % of an organotin di- or tricarboxylate and from about 20 to about 50% by weight of an organic fluoroacid.

2. The composition of claim 1 comprising from about 50 to about 60 wt. % of the organotin di- or tricarboxylate, and from about 40 to about 50% by weight of the fluoroacid.

3. The composition of claim 1 wherein the organotin di- or tricarboxylate has the formula $R'_xSn(O_2CR'')_{4-x}$, where
R' is a $C_1$ to $C_4$ straight- or branched-chain alkyl, or $R'''CH_2CH_2$, where
R''' is $R^{IV}O_2C$ or $CH_3CO$, and where
$R^{IV}$ is $C_1$ to $C_4$ alkyl,
R'' is $C_1$ to $C_4$ straight- or branched-chain alkyl, and x is 1 or 2, and
the fluoroacid is selected from the group consisting of trifluoroacetic acid, difluoroacetic acid, perfluoropropionic acid, chlorodifluoroacetic acid, trifluoroacetic anhydride and perfluoropropionic anhydride.

4. The composition of claim 1 wherein the organotin di- or tricarboxylate is selected from the group consisting of dibutyltin diacetate, butyltin triacetate, methyltin triacetate, dimethyltin diacetate, dibutyltin dipropionate, dimethyltin dipropionate, methyltin tripropionate, diisobutyltin diacetate, bis(carbomethoxyethyl)tin diacetate, and bis(3-oxobutyl)tin diacetate.

5. The composition of claim 1 wherein the organotin di- or tricarboxylate is dibutyltin diacetate, and the organic fluoroacid is trifluoroacetic acid.

6. The composition of claim 1 comprising about 60 wt. % dibutyltin diacetate and about 40 wt. % trifluoroacetic acid.

7. The composition of claim 1, being substantially devoid of solvent.

8. The method of coating a transparent substrate which comprises applying to the substrate a liquid coating composition consisting of a fluoroacid and an organotin di- or tricarboxylate having the general formula $R'_xSn(O_2CR'')_{4-x}$, where
R' is a $C_1$ to $C_4$ straight- or branched-chain alkyl, or $R'''CH_2CH_2$, where
R''' is $R^{IV}O_2C$ or $CH_3CO$, and where
$R^{IV}$ is $C_1$ to $C_4$ alkyl,
R'' is $C_1$ to $C_4$ straight- or branched-chain alkyl, and x is 1 or 2.

9. The method of claim 8 wherein the organotin di- or tricarboxylate is selected from the group consisting of dibutyltin diacetate, butyltin triacetate, methyltin triacetate, dimethyltin diacetate, dibutyltin dipropionate, dimethyltin dipropionate, methyltin tripropionate, diisobutyltin diacetate, bis(carbomethoxyethyl)tin diacetate, and bis(3-oxobutyl)tin diacetate.

10. The composition of claim 8 wherein the organotin di- or tricarboxylate is dibutyltin diacetate, and the organic fluoroacid is trifluoroacetic acid.

11. The composition of claim 8 comprising about 60 wt. % dibutyltin diacetate and about 40 wt. % trifluoroacetic acid.

12. The composition of claim 8, being substantially devoid of solvent.

* * * * *